Nov. 6, 1928.　　　　　　　　　　　　　　1,690,384
F. H. TREGO
INTERNAL COMBUSTION ENGINE
Filed March 21, 1923　　　13 Sheets-Sheet 1

INVENTOR
Frank H. Trego
BY
ATTORNEYS

Nov. 6, 1928.  F. H. TREGO  1,690,384
INTERNAL COMBUSTION ENGINE
Filed March 21, 1923   13 Sheets-Sheet 2

F. H. TREGO

1,690,384

INTERNAL COMBUSTION ENGINE

Filed March 21, 1923

F. H. TREGO 1,690,384

INTERNAL COMBUSTION ENGINE

Filed March 21, 1923 13 Sheets-Sheet 5

Fig. 10.

INVENTOR
Frank H. Trego
BY
ATTORNEYS

F. H. TREGO 1,690,384

INTERNAL COMBUSTION ENGINE

Filed March 21, 1923 13 Sheets-Sheet 7

Fig. 12.

Inventor
Frank H. Trego
By his Attorneys
Moses, Hammond, Moses & Nolte

Nov. 6, 1928.

F. H. TREGO

1,690,384

INTERNAL COMBUSTION ENGINE

Filed March 21, 1923

F. H. TREGO

1,690,384

INTERNAL COMBUSTION ENGINE

Filed March 21, 1923   13 Sheets-Sheet 10

INVENTOR
Frank H. Trego
BY
ATTORNEYS

Nov. 6, 1928.  1,690,384

F. H. TREGO

INTERNAL COMBUSTION ENGINE

Filed March 21, 1923  13 Sheets-Sheet 11

INVENTOR
Frank H. Trego
BY
ATTORNEYS

Nov. 6, 1928.

F. H. TREGO 1,690,384

INTERNAL COMBUSTION ENGINE

Filed March 21, 1923      13 Sheets-Sheet 12

INVENTOR
Frank H. Trego
BY
ATTORNEYS

Nov. 6, 1928.

F. H. TREGO 1,690,384

INTERNAL COMBUSTION ENGINE

Filed March 21, 1923   13 Sheets-Sheet 13

Fig. 23.

INVENTOR
Frank H. Trego
BY Moser, Hammond,
Moser + Nolte
ATTORNEYS

Patented Nov. 6, 1928.

1,690,384

UNITED STATES PATENT OFFICE.

FRANK H. TREGO, OF NEW YORK, N. Y., ASSIGNOR TO TREGO ENGINEERING CORPORATION, OF NEW YORK, N. Y., A CORPORATION OF NEW YORK.

INTERNAL-COMBUSTION ENGINE.

Application filed March 21, 1923. Serial No. 626,449.

The present invention relates to internal combustion engines, and particularly to a new and improved arrangement of valves and mechanism for operating the same, whereby important advantages from the standpoint of efficiency are obtained, in comparison with engines heretofore known.

It is generally recognized that the efficiency of internal combustion engines of the kinds in general use could be substantially improved, if it were possible to increase the compression to which the explosive charge is subjected before ignition. It has been found however, with engines of standard types employing for each cylinder merely an inlet valve and an exhaust valve (or a plurality of them) controlling communication directly with the cylinder, that increase of compression beyond a certain point is impossible, owing to the occurrence of what is usually referred to as "hammering," "detonation," or "knocking." These terms are used to denote the jarring and noises which are caused by sudden excessive waves of pressure within the cylinder; and it is generally recognized that these excessive pressures result from the presence of what are usually termed "hot spots" within the combustion space of the engine cylinder, when using commercial gasoline and air as the explosive mixture. The generally recognized theory is that these hot spots cause portions of the explosive mixture surrounding them to flash at excessive speeds and cause waves of pressure within the cylinder which produce the hammering, detonation, or knocking above referred to. It is also recognized that the more perfect the condition of the explosive charge, the less likely is the occurrence of this objectionable condition.

The present invention is the result of a realization that one of the most objectionable of the hot spots within the cylinder of an internal combustion engine is usually the exhaust valve or parts adjacent thereto. One of the objects of the present invention, therefore, is to obviate this hot spot; and in accomplishing this it has also been found possible to improve the quality of the explosive mixture introduced into the cylinder, by heating and thereby vaporizing most of the fuel contained in the mixture just as it enters the cylinder.

In attaining the results above mentioned, the present invention provides an engine which is characterized by the facts among others, that each cylinder is provided with three valves, preferably of the poppet type, one of which, hereinafter called the cylinder valve, controls communication between the inside of the cylinder and a chamber outside the latter, while the others serve as an inlet and an exhaust valve opening into said chamber. Said valves are preferably so actuated that the cylinder valve is closed from the time compression of the explosive mixture begins until the escape of the exhaust gases commences, and is open the remainder of the time; while the inlet and exhaust valves are so actuated that they control the beginning of the admission of the explosive mixture and the ending of the escape of the exhaust gases, and insure that the chamber into which said inlet and exhaust valves open shall never be at any time in communication with both the inlet pipe and the exhaust pipe. All of said valves are preferably closed by the action of individual springs, and are positively opened by proper mechanisms.

With this arrangement of valves, any hot spot in the neighborhood of the cylinder valve is obviated, owing to the fact that this valve and the walls of the cylinder adjacent thereto are constantly being swept and cooled by the incoming explosive mixture. Moreover, the heating of the fuel in the explosive mixture as it passes over these parts, helps to more completely vaporize said fuel and thus improve the quality of the charge. It is, therefore, possible with an engine of this type to materially increase the compression to which the charge is subjected, with consequent increase in efficiency due to this fact, and also due to the improved quality of the explosive mixture.

An internal combustion engine, of the kind above mentioned, to be efficient and satisfactory in operation, must not only be provided with three poppet valves, cooperating with each cylinder and with its auxiliary chamber in the manner above mentioned, but must also be provided with suitable means for operating such valves. In providing such valve operating means, however, difficulties are involved due to limitations of space and other factors which are inherent in internal combustion engines used for most purposes such as automobiles, aeroplanes, boats, etc. One of the objects of the present invention, therefore is to provide an arrangement of such valves, and means for operating them, which will be efficient and practical. The various features of the valve arrangements and valve operating mechanisms in which the invention is embodied will be hereinafter described in detail, but it may be here stated that one of the characteristic novel features of this invention resides in the fact that the inlet and exhaust valves are so arranged with reference to the cylinder valve that the stems of all the valves may be readily actuated either from a cam shaft located longitudinally of the engine above the cylinders or from a cam shaft located at some other point as in the crank case of the engine. Another novel feature of the invention is found in the relative arrangement of the valves whereby valves of sufficient size may be employed without increasing the length of the engine over the length of standard engines employing only two valves per cylinder. Other novel features of the invention will hereinafter appear and will be pointed out in the appended claims.

Referring to the drawings.

The form of the invention shown in Figs. 1 to 5, will first be described. This valve mechanism is characterized by the fact that it is adapted to be actuated from a cam-shaft located alongside of the engine, for example, within the crank case. Inasmuch as it is a standard practice to locate a valve operating cam-shaft within the crank case of an internal combustion engine, the valve mechanism about to be described is especially adapted for incorporation in engines of standard design.

Figure 1:
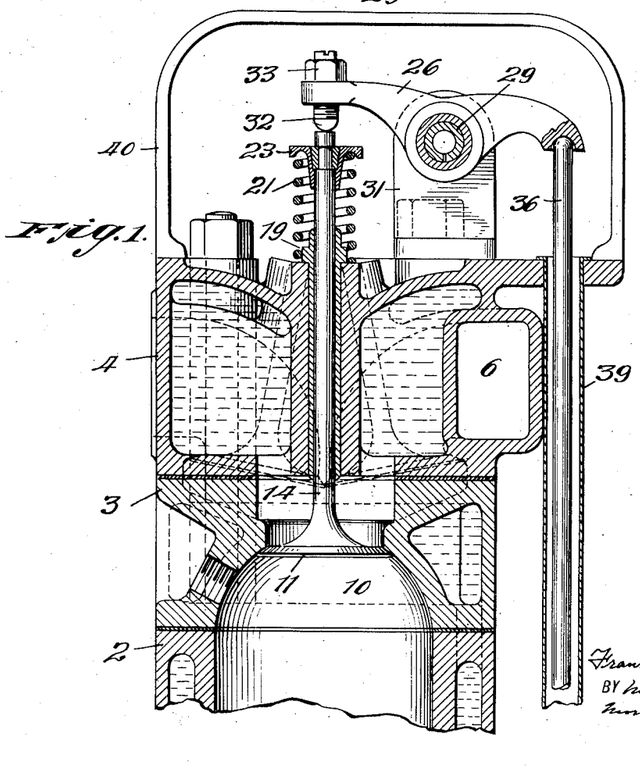
Fig. 1 is a fragmentary sectional elevation of the head of an engine cylinder having one form of the invention embodied therein, showing particularly the cylinder valve and its operating mechanism.
Figure 2:
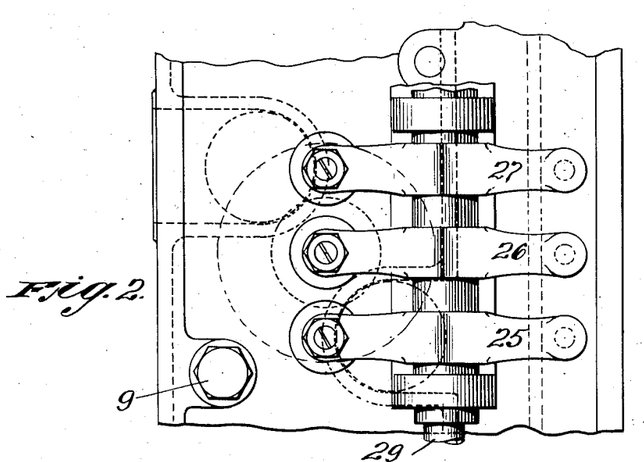
Fig. 2 is a fragmentary plan view of the mechanism shown in Fig. 1.
Figure 3:
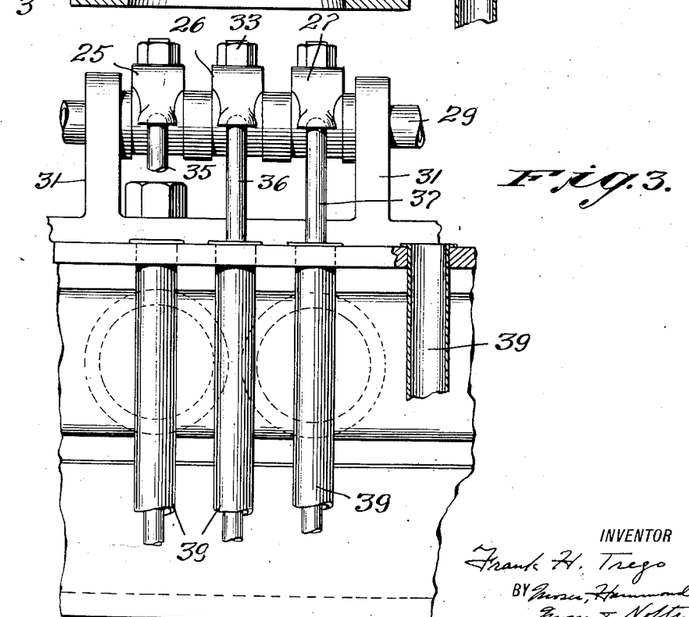
Fig. 3 is a fragmentary side elevation, partly in section, of said mechanism.
Figure 4:
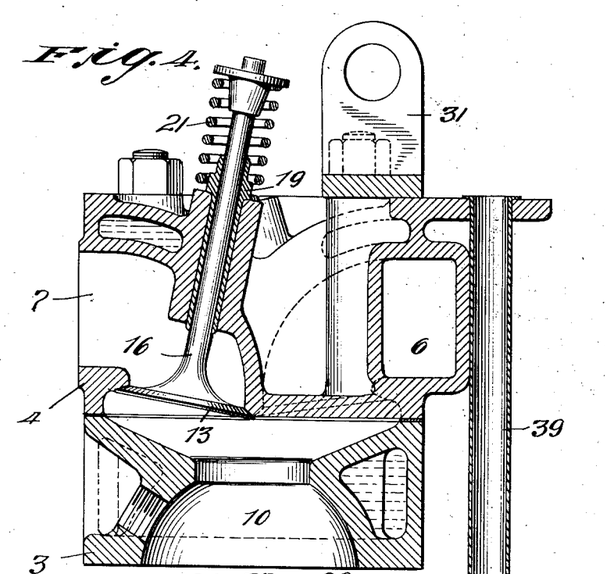
Fig. 4 is a fragmentary sectional elevation of said mechanism showing particularly the exhaust valve.
Figure 5:
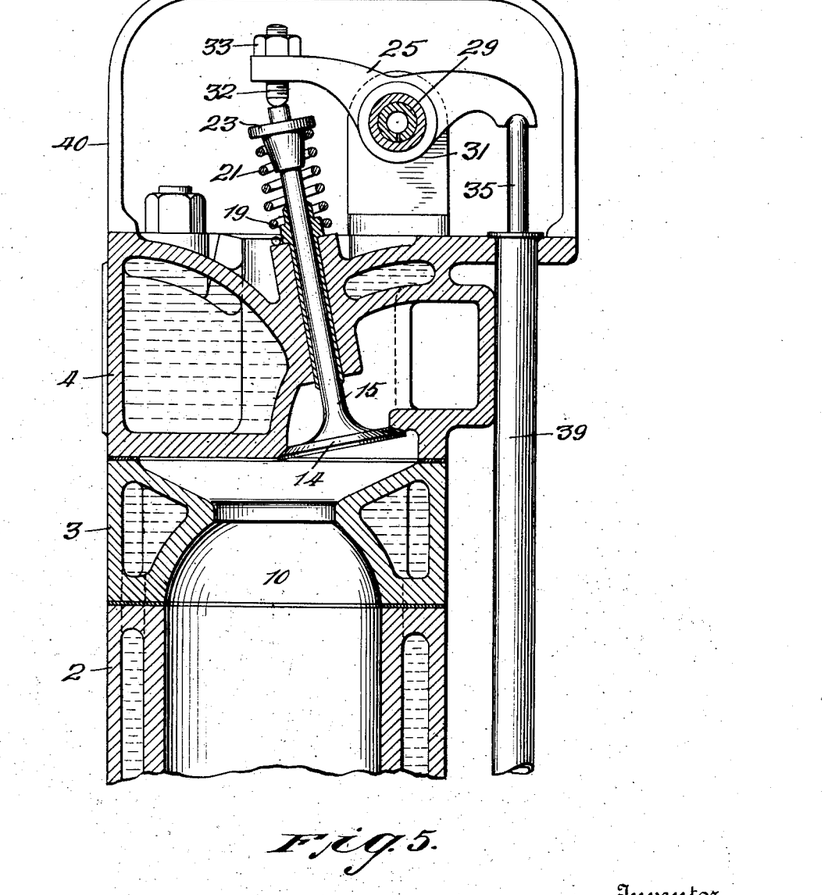
Fig. 5 is a fragmentary sectional elevation of said mechanism showing particularly the inlet valve.

Referring to the drawings, the top of an engine cylinder is shown at 2; and in cooperative relation to this is a cylinder head casting 3, the form of which will be apparent from the drawings. Arranged in cooperation with the outside of the cylinder head 3 is a casting 4, which may be called a valve casing since it serves as a support for the stems of the valves hereinafter described, and because it contains an inlet passage 6, and an exhaust passage 7. As shown in the drawings, the castings 2, 3, and 4, are provided with cored passages through which water may be circulated for cooling purposes; and said castings are held in cooperative relation by means of bolts 9, or in any other suitable manner. It will be noted that the cylinder head 3, is provided in its lower side with a more or less spherical cavity 10, which serves as combustion space at the end of cylinder 2; and that said cylinder head is provided with a valve port which is closed by a poppet valve 11. It will also be noted that the upper side of the cylinder head 3, is provided with a cavity which communicates with inlet and exhaust valve ports in the bottom of the valve casing 4. As shown in Fig. 4, the exhaust port 7, is controlled by the poppet valve 13; and as shown in Fig. 5, the inlet port 6 is closed by the poppet valve 14. For reasons which will be obvious, the cylinder valve port is horizontally arranged and the inlet and exhaust valve ports are located in planes inclined to the horizontal; and it will also be noted that the valve stem 14ª of the cylinder valve 11 lies in a vertical plane passing through the axes of the various engine cylinders, and that the inlet and exhaust valves are located on opposite sides of said plane with their stems 15 and 16 inclined so that their upper ends will lie in the aforesaid plane. The valve stems, 14ª, 15 and 16, are journaled in holes in the valve casing 4, which are lined with bushings 19 in a usual manner; and said valves are yieldingly held in their closed positions by means of coiled springs 21 surrounding the upper ends of said valve stems and interposed between the top of the valve casing 4 and collars 23 secured to the upper ends of said valve stems in the conventional manner shown or in any other suitable way. Inasmuch as the upper ends of all of the valve stems 14ª, 15 and 16 lie in the same plane longitudinally of the engine, all of said stems may be acted upon by rocker arms of substantially the same length and kind. As shown, these rocker arms 25, 26 and 27 are pivotally mounted upon a common shaft 29, preferably made hollow for lubricating purposes, which is supported in brackets 31 secured to or integral with the valve casing 4. The rocker arms 25, 26 and 27, the forms of which will be apparent from the drawings, are preferably provided with screws 32 threaded in the ends of said rocker arms and locked in any position to which they may be adjusted by means of lock nuts 23. At their other ends, said rocker arms are provided with cavities adapted to receive the upper ends of push-rods 35, 36 and 37. These push rods extend downwardly preferably thru housings 39, and at their lower ends are provided with cam followers arranged to cooperate with cams on a shaft within the crank case, these parts not being shown as they may be of any suitable and well-known construction, except as to the shapes of the cams which will be hereinafter described. In order to protect the valve mechanism, a removable cover 40 cooperating with the top of the valve casing 4 is preferably provided.

It will be evident from the foregoing description of the form of the invention shown in Figs. 1 to 5, that the cylinder valve 11 controls communication between the inside of the engine cylinder and the chamber provided between the top of the cylinder head 3 and the bottom of the valve casing 4; and that communication between this chamber and the inlet and exhaust passages 6 and 7 is controlled by the valves 14 and 13. It will also be noted that the chamber between the cylinder head and the valve casing is so formed as to allow free passage of the explosive mixture and the exhaust gases to and from the cylinder valve. During operation of the engine, the cylinder valve 11, which is closed when the explosion takes place in the cylinder, shields the inlet and exhaust valves from the influence of the burning mixture; and yet the cylinder valve 11 is not excessively heated, owing to the fact that it is constantly being cooled by the explosive mixture which flows past said valve into the cylinder. Moreover, this absorption of heat by the incoming explosive mixture has a beneficial effect upon the efficiency of the engine because the explosive mixture is improved in quality by the heating and vaporization of the fuel in it just as it is entering and cylinder.

Figure 6:
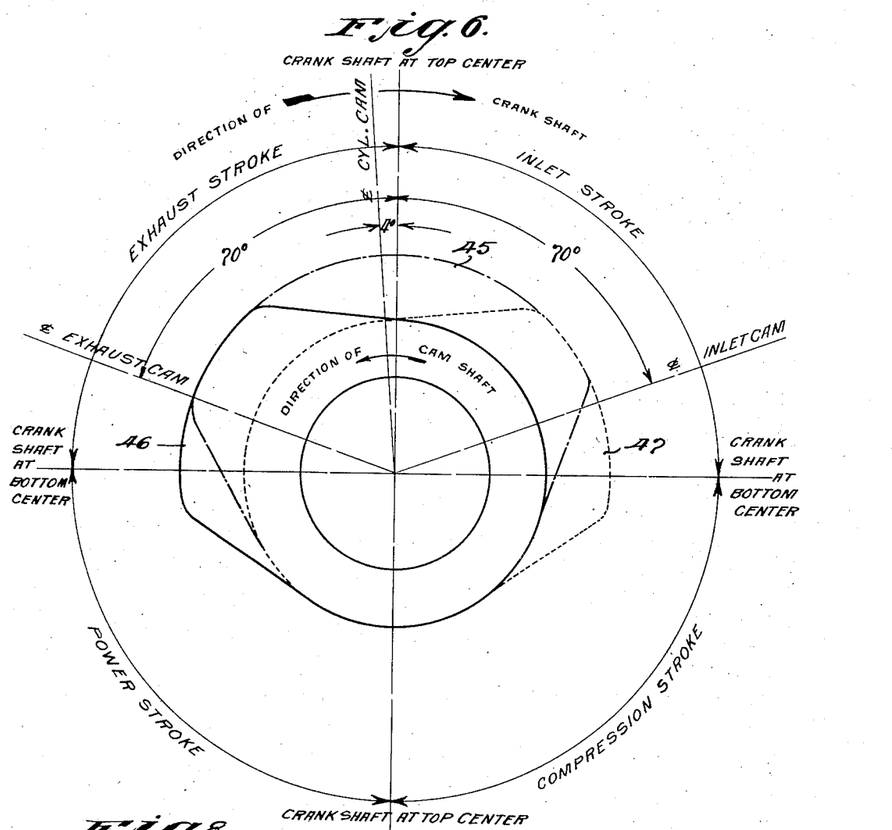
Fig. 6 is a diagram showing the forms of cams which may be used in the various illustrated forms of the invention, and their angular relation with reference to the crank shaft of the engine.
Figure 7:
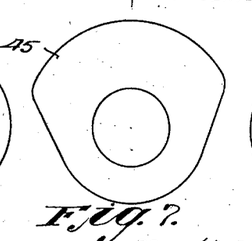
Figs. 7, 8 and 9, show the forms of said cams.
Figure 8:
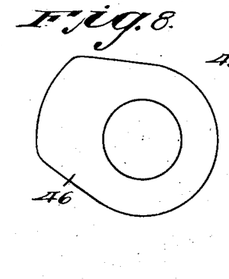
Figure 9:
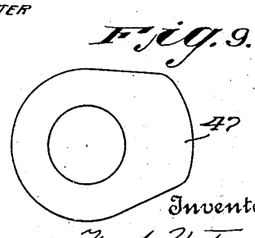
Figure 10:
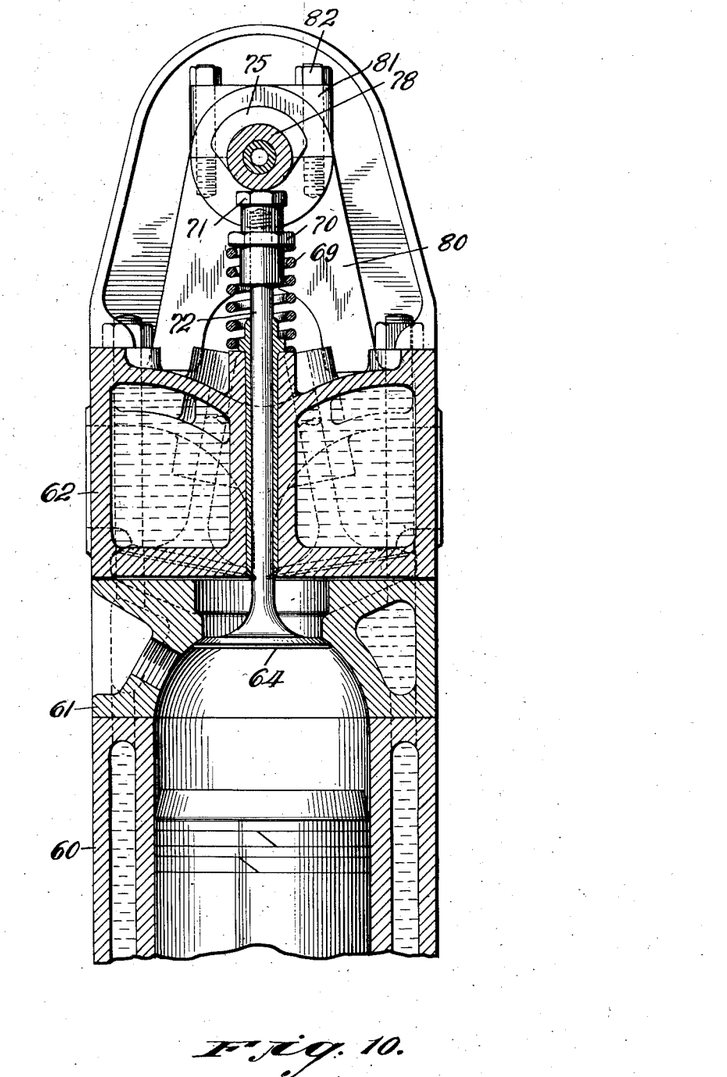
Figs. 10, 11 and 12, are fragmentary sectional elevations showing the head of an engine cylinder having another form of the invention embodied therein.
Figure 11:
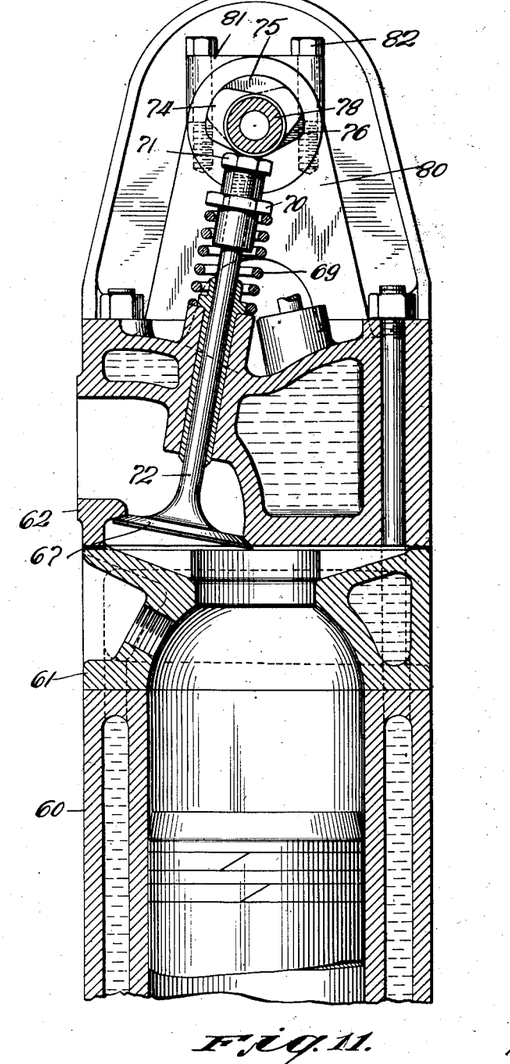
Figure 12:
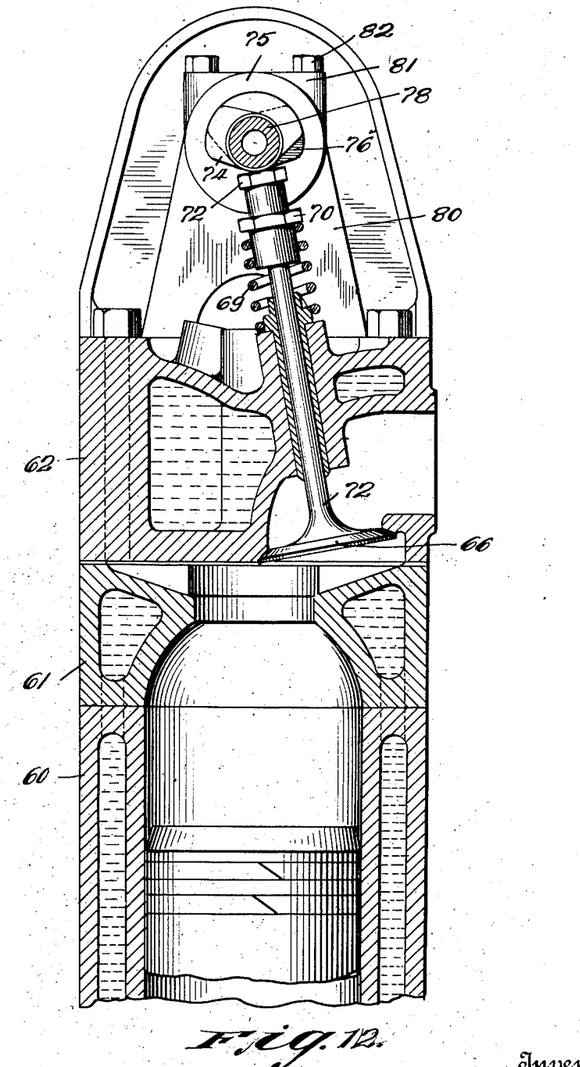
Figure 13:
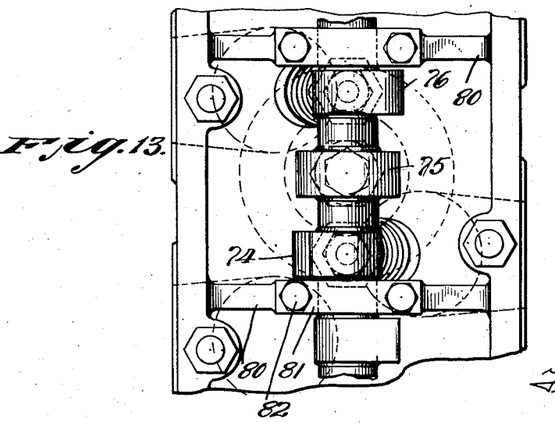
Fig. 13 is a fragmentary plan view of the mechanism shown in Figs 10, 11 and 12.

While it is obvious that the operation of the valves in the engine of Figs. 1 to 5 may be considerably varied, I will now describe with the aid of Figs. 6, 7, 8 and 9, certain cam designs and arrangements which would be satisfactory in a four cylinder engine. In considering Fig. 6, it is to be understood that the cam shaft is geared so as to revolve at one-half of the speed of the engine crank shaft, and that the cams shown are intended to cooperate with cam followers of the roller type. The forms of the cylinder valve cam 45, the exhaust valve cam 46, and the inlet valve cam 47, will be evident from Figs. 7, 8 and 9; and the preferable relation of these cams to one another and to the crank shaft of the engine is indicated in Fig. 6, in which the outline of the cylinder valve cam 45 is indicated in dot-and-dash lines, the outline of the exhaust valve cam 46 is indicated in full lines, and the outline of the inlet valve cam 47, is indicated in dotted lines.

From Fig. 6, it will be evident that the cams 45, 46 and 47, will serve to actuate the cylinder valve and the inlet and exhaust valves in approximately the following manner: Assuming that the engine crank corresponding to the cylinder for which the valves are shown, is at its top center at the end of the compression stroke, all of the valves will be in their closed positions. Bearing in mind that the cam-shaft rotates at one-half the speed of the engine crank shaft, it will be evident that cam 46, begins to open the exhaust valve about 80° after the top center of the crank shaft; that the cam 45 begins to open the cylinder valve about 45° before bottom center of the crank shaft; that the cam 46 permits the exhaust valve to completely close when the crank has reached top center again; that the cam 47 begins to open the inlet valve immediately after the exhaust valve has completely closed; that the cam 45 permits the cylinder valve to completely close about 30° after the crank has reached bottom center for the second time; and that cam 47 permits the inlet valve to completely close about 100° after the crank has reached bottom center, for the second time. With this form and setting of valve cams, it will be evident that the cylinder valve will be open approximately 435° out of two revolutions of the crank shaft; and that the exhaust and inlet valves will each be open approximately 280° during each two revolutions of the crank shaft. As hereinbefore stated, however, it will be understood that the form and setting of the valve cams may be varied considerably in the types of engines herein described.

The form of the invention shown in Figs. 10 to 14 will now be described. The principal difference between this form of the invention and the form shown in Figs. 1 to 5, resides in the fact that the valves are operated by cams located on a cam shaft mounted longitudinally of the engine above the cylinders, instead of by a cam shaft arranged in the crank case, thereby making the use of push rods and rocker arms unnecessary. So far as the cylinder 60, cylinder head 61, valve casing 62, cylinder valve 64, inlet valve 66, and exhaust valve 67, are concerned, these parts may be similar to the parts hereinbefore described in connection with Figs. 1 to 5. The ends of the various valve stems 72, however, are each threaded and provided with a sleeve and collar 70 which is slidable upon such valve stems and engages the outer ends of the spring 69, being held against upward movement by the cam followers 71 which screw on to the threaded ends of the valve stems. These cam followers 71 on the ends of the stems of the three valves cooperate respectively with cams 74, 75 and 76, rigidly secured to the cam shaft 78. This cam shaft 78 is journaled in bearings in bracket 80 extending upwardly from the valve casing 62, and provided with cap plates 81 bolted to the brackets 80 by cap screws 82. The cams 74, 75 and 76 may be of the general form hereinbefore described and shown in Figs. 7, 8 and 9, and are mounted on the shaft 78 in relations with reference to one another which will be obvious; it being understood that the cam shaft 78 is so geared to the engine crankshaft that the former will rotate at one-half the speed of the latter. Owing to the fact that the cam followers 71, are adjustable longitudinally upon the valve stems 72, the effective length of the valve stems may be regulated so as to secure satisfactory closing of the valves by the springs 69 and opening thereof by the cams 74, 75 and 76.

Figure 14:
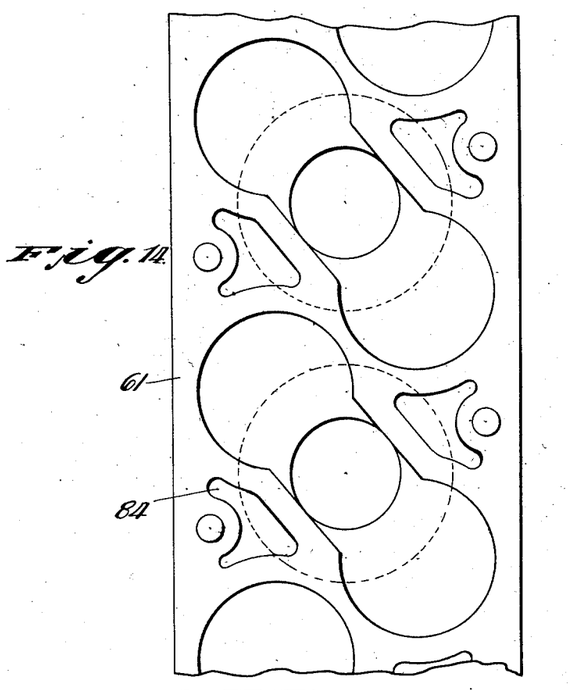
Fig. 14 is a plan view of the cylinder head casting used in the form of the invention shown in Figs. 10, 11 and 12.

Fig. 14 is a plan view of the top of the cylinder head 61 and shows both the form and relation of the cavities in the top of the cylinder head and also passages 84 communicating with the cored passages in the cylinder head for the cooling water, it being understood that similar openings exist in the bottom of the valve casing 62 and the top of the cylinder casting 60, in order to permit the circulation of cooling water from one casting to another. This construction is embodied in the other forms of the invention herein described.

Figure 15:
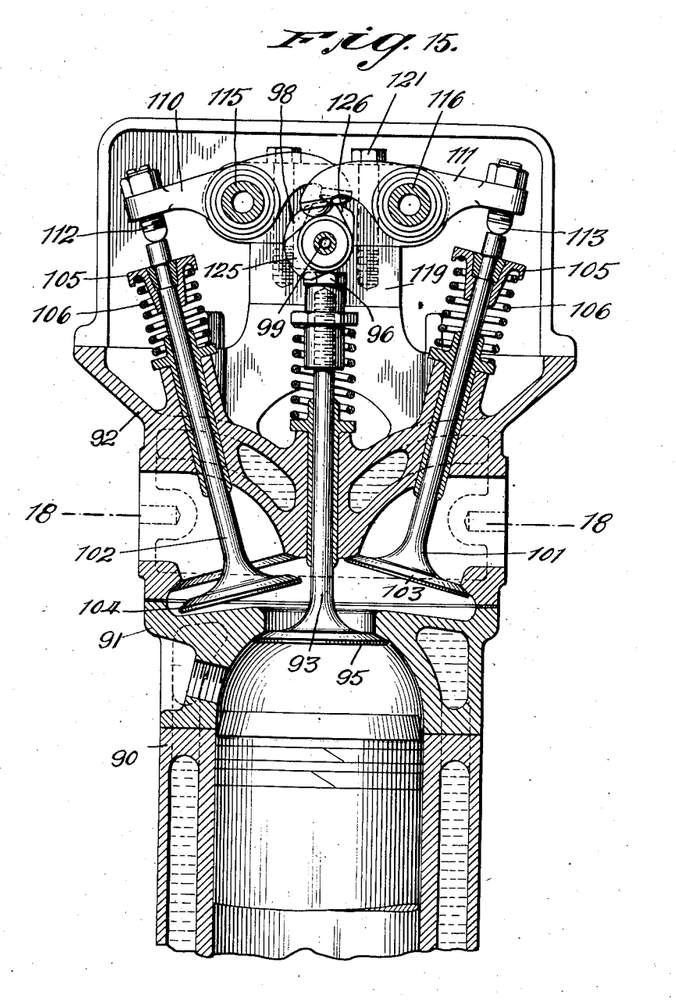
Fig. 15 is a fragmentary sectional elevation of an engine cylinder, showing still another form of the invention.
Figure 16:
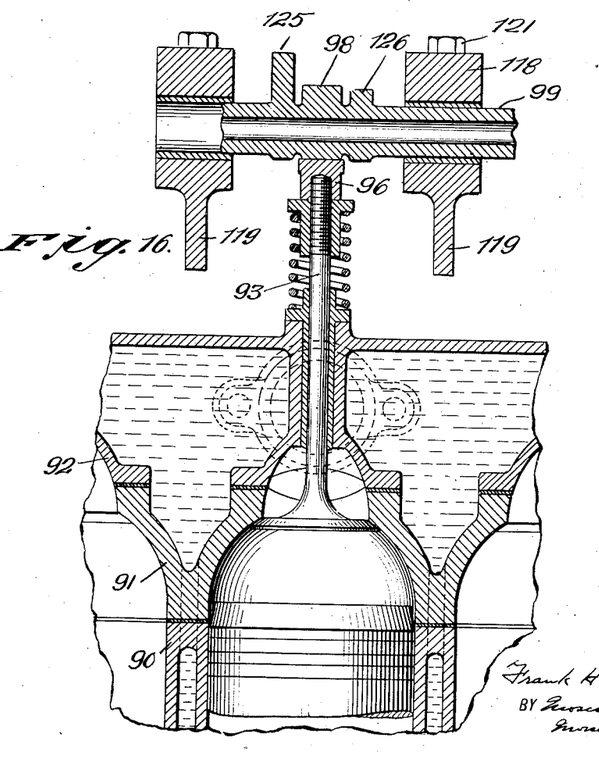
Fig. 16 is a fragmentary sectional elevation taken at right angles to Fig. 15.
Figure 17:
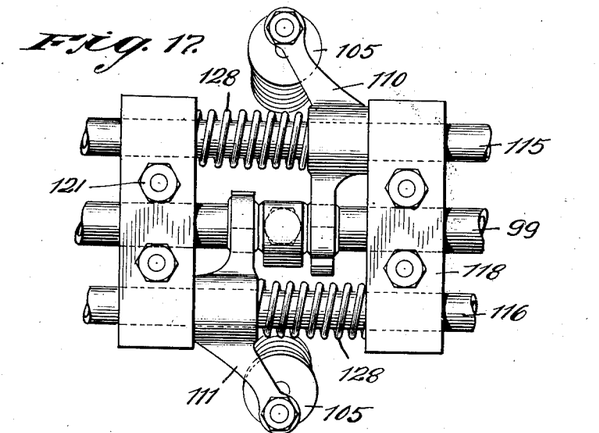
Fig. 17 is a fragmentary plan view of the valve operating mechanism shown in Figs. 15 and 16.
Figure 18:
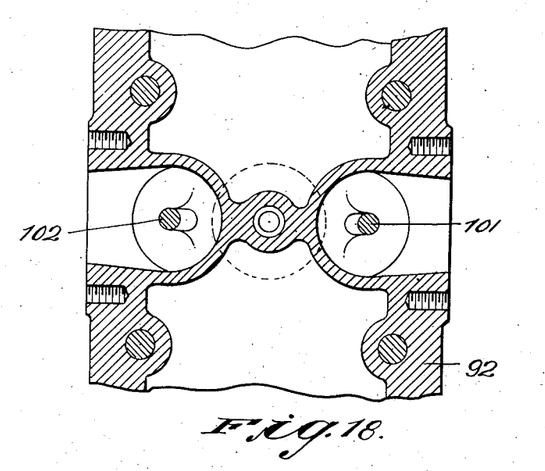
Fig. 18 is a fragmentary plan view on the line 18—18 of Fig. 15.
Figure 19:
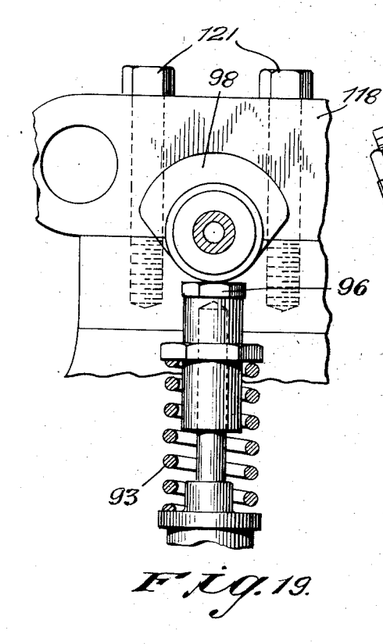
Figs. 19 and 20 are fragmentary elevations of portions of the valve operating mechanisms shown in Figs. 15 to 17.
Figure 20:
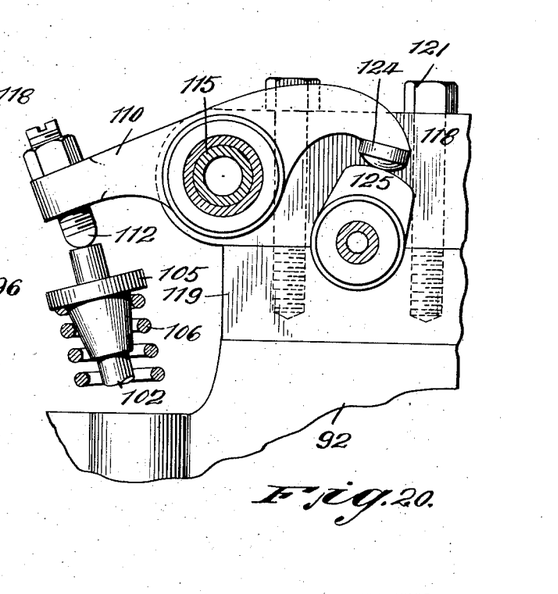

Still another form of the invention is shown in Figs. 15 to 20, this form being characterized by a cam shaft running longitudinally of the engine and located above the cylinders, from which shaft the cylinder valves are operated directly and the inlet and exhaust valves are operated through rocker arms. The form and relation of the cylinder 90, cylinder head 91, and valve casing 92 in this embodiment of the invention will be obvious from Figs. 15, 16 and 18, and from the previous descriptions of similar parts. The stem 93 of the cylinder valve 95 carries a cam follower 96 which cooperates with the cam 98 secured to the cam shaft 99. The stems 101 and 102 of the inlet valve 103 and the outlet valve 104 are so mounted in the valve casing 92 as to be laterally inclined; and are provided with collars 105 engaged by springs 106, after the manner of the arrangement shown in Figs. 1, 4 and 5 and hereinbefore described. By arranging the valve stems 101 and 102 in this way, it is possible to arrange the rocker arms 110 and 111, so that screws 112 and 113 in their ends will cooperate with the ends of said valve stems. The rocker arms 110 and 111 are pivotally mounted on shafts 115 and 116 extending longitudinally of the engine. These shafts 115 and 116, which may be made hollow for lubricating purposes, are shown as supported in blocks 118 which cooperate with brackets 119 which extend upwardly from the valve casing 92 and serve to journal the cam shaft 99, said blocks being secured to the brackets 119 by the cap screws 121. The rocker arms 110 and 111 are provided with ends having cam followers 124 which cooperate with cams 125 and 126 secured to the cam shaft 99, as best shown in Figs. 15 and 20. As shown in Fig. 17, rocker arms 110 and 111 are offset so that the ends carrying screws 112 and 113 will extend over the ends of the valve stems 102 and 101. As hereinbefore mentioned, the rocker arms 110 and 111 are pivotally mounted on the shafts 115 and 116; and, as shown in Fig. 17, said rocker arms may conveniently be held with their hubs against the blocks 118 by means of coiled springs 128 surrounding the shafts 115 and 116 and arranged between each of the arms 110 and 111 and the blocks 118. It will be evident that with the valve arrangement shown in Figs. 15 to 20, all three of the valves may be located with their axes in a plane at right angles to the longitudinal axis of the engine; but it will be understood that, if desired, said valves may be arranged as shown in the forms of the invention hereinbefore described.

Figure 21:
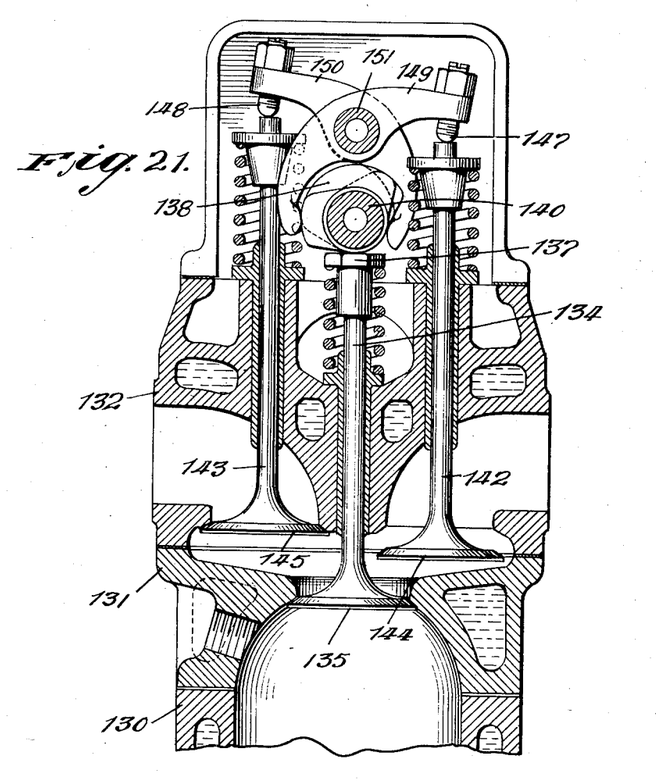
Fig. 21 is a fragmentary sectional elevation of an engine valve mechanism embodying another form of the invention.
Figure 22:
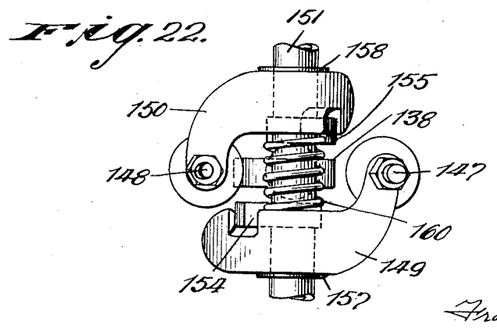
Fig. 22 is a fragmentary plan view of a portion of the mechanism shown in Fig. 21

Referring now to the embodiment of the invention shown in Figs. 21 and 22, it will be obvious that this form is similar to the form shown in Figs. 15 to 20 and hereinbefore described, the principal difference being that the stems of the inlet and exhaust valves, as well as the stems of the cylinder valves, are vertically arranged; and the rocker arms cooperating with the stems of the inlet and exhaust valves are pivotally mounted on a common shaft arranged longitudinally of the engine above the cam shaft. The forms of the cylinder 130, cylinder head 131, and valve casing 132, will be obvious from Fig. 21 and previous description of similar parts. The stem 134 of the cylinder valve 135 is provided at its upper end with a follower 137 which cooperates with the cam 138 secured to the cam shaft 140. The stems 142 and 143 of the inlet and exhaust valves 144 and 145 are engaged at their upper ends by screws 147 and 148 carried by the ends of rocker arms 149 and 150 which are pivotally mounted on a shaft 151 extending longitudinally of the engine. As best shown in Fig. 22, the rocker arms 149 and 150 are preferably offset so that the ends carrying the screws 147 and 148 will lie above the ends of the valve stems 142 and 143, while the other ends of said rocker arms which terminate in cam followers will be in position to cooperate with the cams 154 and 155. The rocker arms 149 and 150 may be held from longitudinal movement away from one another by the collars 157 and 158 fixed on the shaft 151; and a coiled spring 160 surrounding the shaft 151 and interposed between the rocker arms, may be employed to retain the latter in engagement with the collars 157 and 158. The cams 138, 154 and 155 may be of the forms hereinbefore described; and may be arranged with reference to one another so as to properly operate the valves in a manner obvious to one skilled in the art.

Figure 23:
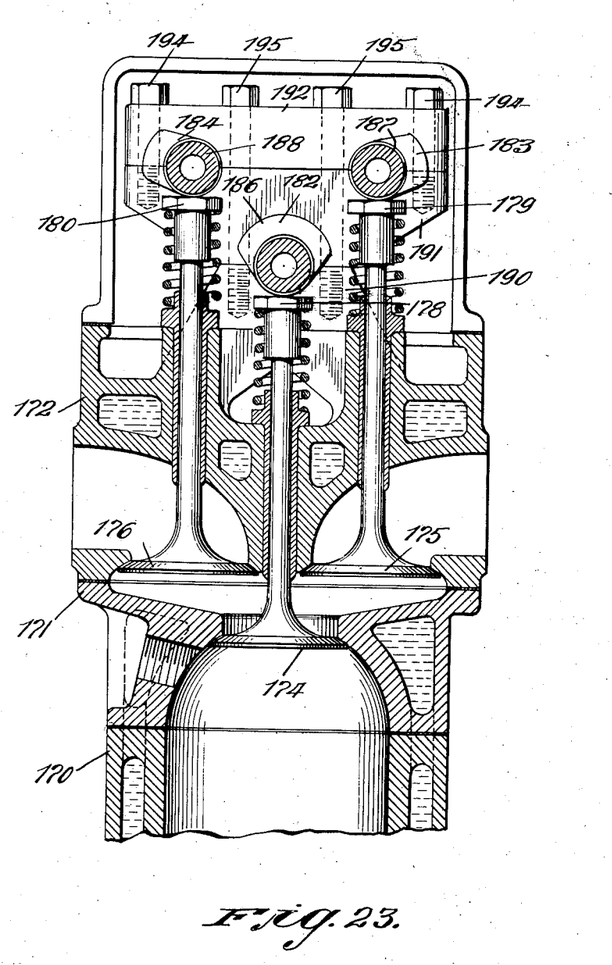
Fig. 23 is a fragmentary elevation of still another form of the invention.

Fig. 23 shows still another form of the invention which is characterized by the fact that all of the valve stems are vertically arranged and are actuated by individual cam shafts arranged longitudinally of the engine. The forms of the cylinder 170, cylinder head 171 and valve casing 172, and the manner in which the cylinder valve 174, inlet valve 175 and exhaust valve 176 are arranged and supported, will be obvious from Fig. 23 and previous descriptions of similar parts. The stems of the valves carry at their upper ends cam followers 178, 179 and 180 which cooperate respectively with cams 182, 183 and 184. These cams, which may be of the forms hereinbefore described, are mounted respectively on cam shafts 186, 187 and 188, which extend longitudinally of the engine. The cam shaft 186 is journaled between extensions 190 of the valve casing and blocks 191; and the cam shafts 187 and 188 are journaled between the blocks 191 and blocks 192; said blocks 191 and 192 being bolted together and to the extensions 190 by means of cap screws 194 and 195. As in the case of the forms of the invention previously described, it will be understood that the cam shafts 186, 187 and 188 are rotated at one-half the speed of the engine crank shaft; and that the cams 182, 183 and 184, carried by said shafts are annularly arranged with reference to one another so as to cause proper actuation of the valves.

While I have shown certain forms in which my invention may be embodied, it is to be understood that these may be modified in many respects without departing from the spirit of the invention as defined in the appended claims.

What I claim is:

1. In an internal combustion engine, a plurality of cylinders arranged adjacent one another with their axes in the same plane, a valve in the upper end of each cylinder controlling communication between the inside of the cylinder and an outside chamber, each of said valves being provided with a stem lying in said plane, and an inlet and an exhaust valve opening into said chamber above each cylinder and located on opposite sides of the aforesaid plane, said inlet and exhaust valves having stems which are inclined so that their upper ends will lie in the aforesaid plane, a spring cooperating with each valve stem for holding its valve in its closed position, and means cooperating with said valve stems for moving said valves to their open positions in opposition to the forces exerted by such springs.

2. In an internal combustion engine, a cylinder, a valve in the end thereof controlling communication between the inside of the cylinder and an outside chamber, said valve having a stem, axially located with reference to said cylinder, inlet and exhaust valves opening into said chamber and provided with stems which are inclined so that the ends of all of said stems will be in line with one another, springs cooperating with said valve stems for holding said valves in their closed positions, and means cooperating with said valve stems for moving said valves to their open positions in opposition to the forces exerted by said springs.

3. In an internal combustion engine, a plurality of cylinders arranged adjacent one another with their axes vertical and in the same plane, a valve in the outer end of each cylinder controlling communication between the inside of the cylinder and an outside chamber, each of said valves being provided with a vertical stem lying in said plane, and an inlet and an exhaust valve opening into said chamber outside each cylinder and located on opposite sides of the aforesaid plane, said inlet and exhaust valves having stems which are inclined so that their upper ends will lie in the aforesaid plane, a spring cooperating with each valve stem for holding its valve in its closed position, and means cooperating with said valve stems for moving said valves to their open positions in opposition to the forces exerted by such springs.

In testimony whereof I have affixed my signature to this specification.

FRANK H. TREGO.